United States Patent
Urbon

(10) Patent No.: US 7,167,245 B2
(45) Date of Patent: Jan. 23, 2007

(54) ALIGNMENT OF LIGHT COLLECTOR TO LASER SCANLINE

(75) Inventor: Michael P. Urbon, Churchville, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/843,260

(22) Filed: May 11, 2004

(65) Prior Publication Data

US 2005/0254052 A1 Nov. 17, 2005

(51) Int. Cl.
*G01B 11/00* (2006.01)
(52) U.S. Cl. .................................... 356/399
(58) Field of Classification Search ............. 250/327.2, 250/484, 586–7; 356/399–401
See application file for complete search history.

(56) References Cited

U.S. PATENT DOCUMENTS

| 4,203,672 | A | * | 5/1980 | Smith, Jr. .................... 356/431 |
| RE31,847 | E | * | 3/1985 | Luckey ........................ 250/581 |
| 4,743,758 | A | | 5/1988 | Chan et al. |
| 4,886,968 | A | * | 12/1989 | Ohnishi et al. ............. 250/586 |
| 5,105,079 | A | | 4/1992 | Boutet et al. |
| 5,134,290 | A | | 7/1992 | Boutet et al. |
| 5,140,160 | A | | 8/1992 | Boutet et al. |
| 5,404,020 | A | * | 4/1995 | Cobbs ......................... 250/548 |
| 5,551,428 | A | * | 9/1996 | Godlewski et al. .......... 600/425 |
| 5,633,510 | A | * | 5/1997 | Rogers ........................ 250/587 |
| 5,943,390 | A | | 8/1999 | Wendlandt et al. |

OTHER PUBLICATIONS

U.S. Appl. No. 10/767,277, Eastman Kodak Company Docket No. 85921, filed on Jan. 28, 2004, inventors Csaszar et al.
U.S. Appl. No. 10/742,222, Eastman Kodak Company Docket No. 85919, filed on Dec. 19, 2003, inventors Urbon et al.

* cited by examiner

*Primary Examiner*—Gregory J. Toatley, Jr.
*Assistant Examiner*—Isiaka O. Akanbi
(74) *Attorney, Agent, or Firm*—Susan L. Parulski

(57) ABSTRACT

An optical imaging system and method for the alignment of a light collector with a laser scanline. The optical imaging system includes: an optical assembly for producing a laser beam scanline directed at a scanning platen, the scanning platen including an opening disposed at each of its ends; first and second photodetectors disposed behind the scanning platen, one at each of the openings; a visual indicator coupled to each of the first and second photodetectors to visually indicate detection of the scanline at the openings of the scanning platen; and a light collector assembly for collecting light emitted, reflected or transmitted by a scanned information media, the light collector assembly being pivotable about a centerpoint of the scanning platen and including an adjustment member for pivotably moving the light collector assembly about the centerpoint to align the light collector assembly with the scanline.

6 Claims, 12 Drawing Sheets

ALIGNMENT OF LIGHT COLLECTOR TO LASER SCANLINE

FIELD OF THE INVENTION

This invention relates in general to optical imaging systems and more particularly to visual aids for facilitating alignment of a laser beam scanline at an imaging region.

BACKGROUND OF THE INVENTION

Storage phosphor imaging systems are known. In one such system, a storage phosphor is exposed to an x-ray image of an object, such as a body part of a patient, to record a latent x-ray image in the storage phosphor. The latent x-ray image is read out by stimulating the storage phosphor with stimulating radiation. Upon stimulation, the storage phosphor releases emitted radiation of a particular wavelength. To produce a signal useful in electronic image processing, the storage phosphor is scanned, for example, by a laser beam deflected by an oscillating or rotating scanning mirror or by a rotating polygon. The emitted radiation from the storage phosphor is reflected by a collector and detected by a photodetector, such as a photomultiplier, to produce an electronic x-ray image signal. The x-ray image signal can then be viewed as a visual image produced by a softcopy display device, such as a CRT or LCD display, or a hardcopy display device, such as a x-ray film printer (laser printer, CRT printer, thermal printer). U.S. Pat. No. Re. 31,847, issued Mar. 12, 1985, inventor Luckey discloses a storage phosphor system. The reader is often referred to as a computed radiography (CR) reader.

The storage phosphor can be disposed on a medium. Such a medium can be flexible, semi-flexible, semi-rigid, or rigid, and can be configured as a sheet or other substantially planar arrangement.

When the storage phosphor is being processed/scanned/read/exposed by the storage phosphor processor/reader, the position of the storage phosphor can be controlled so as to not introduce any artifacts in the processed image.

During scanning, the laser beam is scanned in a scanline over the surface of a storage phosphor screen by a reciprocating galvanometer mirror or polygon rotating mirror in a fast scan direction while the screen is transported under the scanline in a slow scan direction. The reflected light is collected by a light collector and reflected into photomultiplier tubes (PMTs). The light levels are collected by the PMT's and transmitted to the reader electronics were the image is processed.

Prior to operation, the scanline is adjusted to a particular position where the laser beam is not obstructed and the phosphor screen is well controlled for position height. The alignment of the scanline for rotation and translation to a required position is known, for example, as disclosed in U.S. Ser. No. 10/742,222, titled SCANLINE ALIGNMENT SENSORS, by Urbon et al., commonly assigned and incorporated herein by reference.

To maximize the reflected light collected by the light collector, the input opening (e.g., slot) provided for the scanline to enter the light collector must be minimized and the light collector input opening needs to be aligned to the scanline. That is, the position of the scanline as it passes through the light collector is important to promote maximum light transmission by the laser while maintaining a minimum scanline slot opening to maximize the reflected light collected by the collector. Accordingly, there exists a need for an apparatus and method to correctly and accurately position the scanline so as to maximize the light transmission by the laser.

Existing manual methods can be cumbersome and require particular safety precautions. For example, positioning of the scanline can be accomplished visually by an operator observing the scanline while adjusting two axes of a fold mirror, placed in the path of the scanline, as the scanline strikes a tool placed in the scanline path near the entrance of the collector. This technique requires safety hardware and procedures to be followed to ensure laser safety in the presence of the exposed laser beam. Yet, the process can result in significant residual misalignment since the adjustment process is subjective, operator dependent, and the tool is not able to directly interface with the limiting features of the opening.

Accordingly, a need continues to exist for an apparatus and method for correctly and accurately position the scanline so as to maximize the light transmission by the laser while overcoming the problems of existing methods noted above.

SUMMARY OF THE INVENTION

An object of the present invention is to an apparatus and method for position the scanline a laser.

Another object of the present invention is to provide such a method for aligning a light collector to a laser scanline.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided an optical imaging system. The optical imaging system includes an optical assembly, first and second photodetectors, visual detectors, and a light collector assembly. The optical assembly produces a laser beam scanline directed at a scanning platen. The scanning platen includes an opening disposed at each of its ends. The first and second photodetectors are disposed behind the scanning platen, one at each of the openings. A visual indicator is coupled to each of the first and second photodetectors to visually indicate detection of the scanline at the openings of the scanning platen. The light collector assembly collects light emitted, reflected or transmitted by a scanned information media. The light collector assembly is pivotable about a centerpoint of the scanning platen and includes an adjustment member for pivotably moving the light collector assembly about the centerpoint to align the light collector assembly to the scanline.

According to another aspect of the invention, there is provided a method for aligning an optical imaging system. The method comprises the steps of: directing a laser beam scanline at a scanning platen, the scanning platen including an opening disposed at each of its ends; mounting a light collector assembly for pivotable movement about a centerpoint of the scanning platen, the light collector assembly being adapted for collecting light emitted, reflected or transmitted by a scanned information media; providing an adjustment member for pivotably moving the light collector assembly about the centerpoint to align the light collector assembly with the scanline; positioning first and second photodetectors behind the scanning platen, one at each of the openings; and coupling a visual indicator to each of the first and second photodetectors to visually indicate detection of the scanline at the openings of the scanning platen while pivotably adjusting the light collector assembly using the adjustment member.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
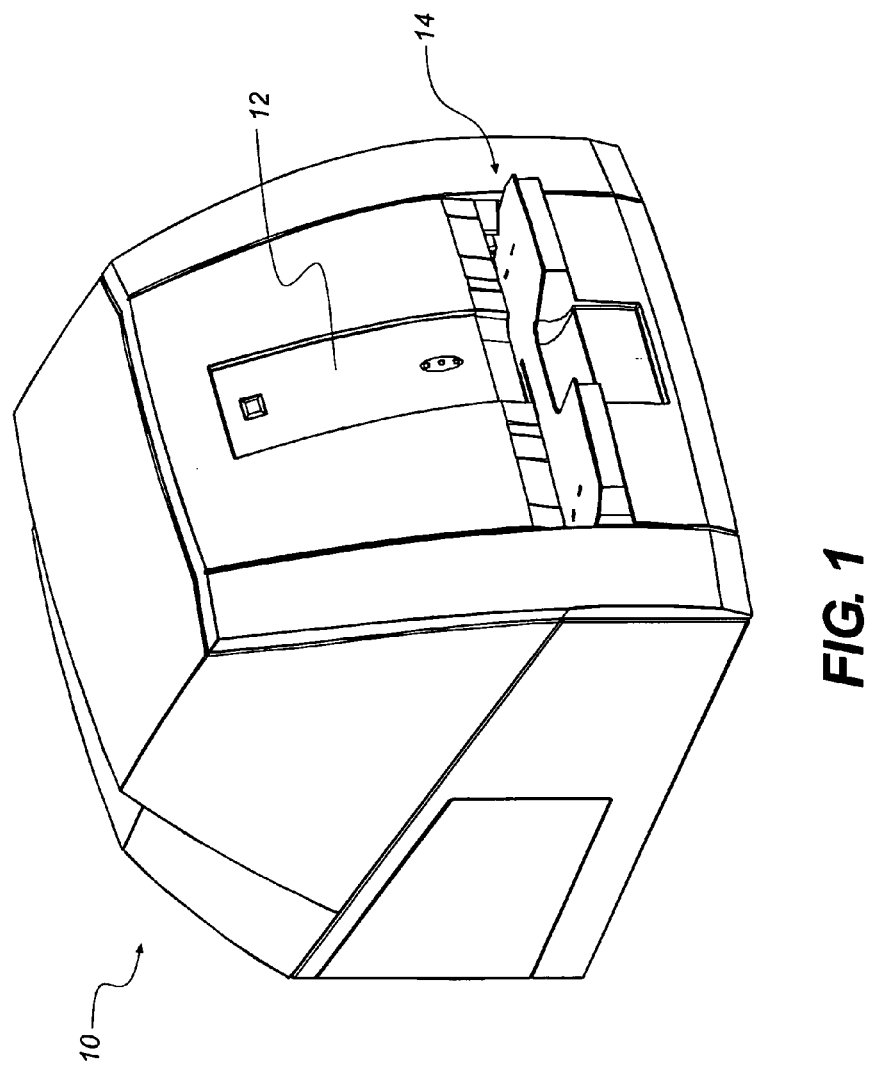
FIG. 1 shows a front perspective view of a storage phosphor reader in accordance with the present invention.
Figure 2:
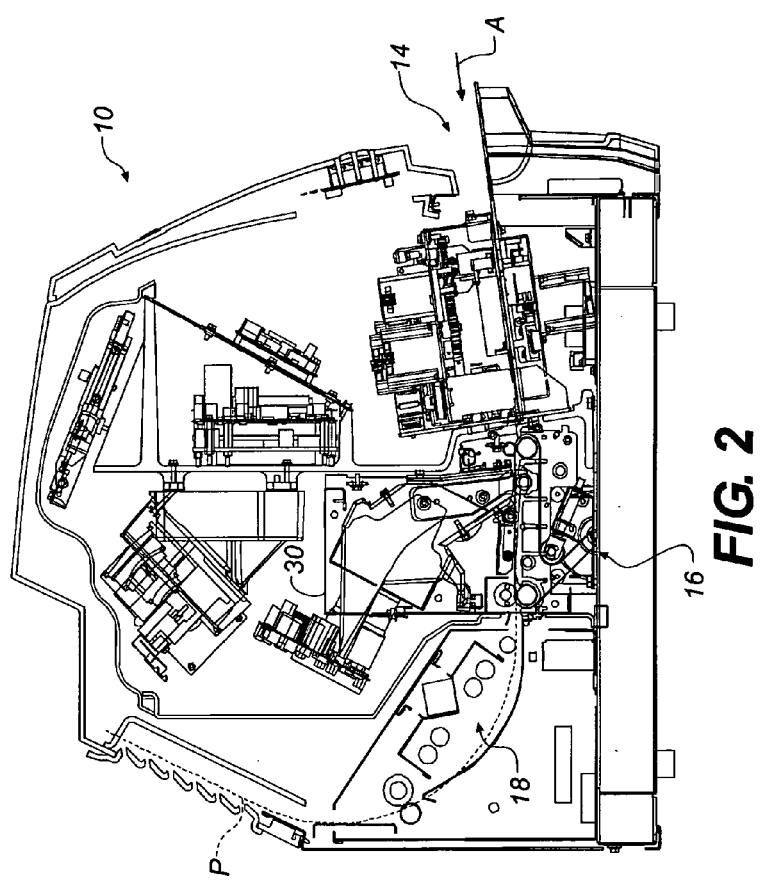
FIG. 2 shows a diagrammatic left side plan view of the storage phosphor reader of FIG. 1.
Figure 3:
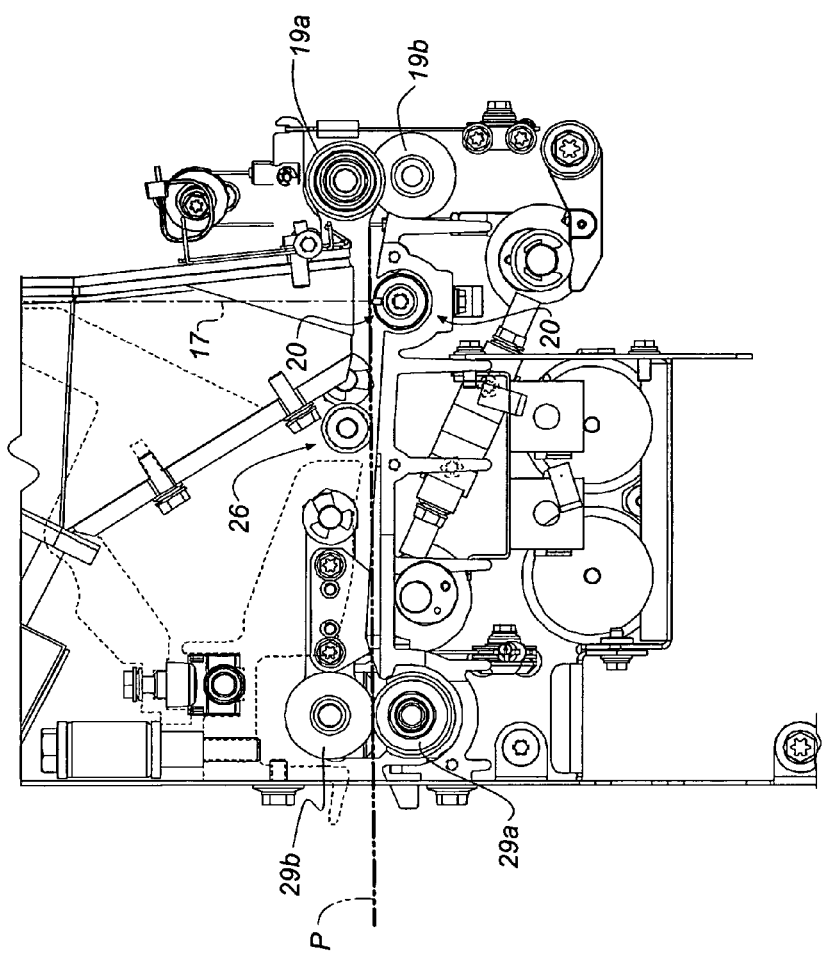
FIG. 3 shows the scan reader assembly of the storage phosphor reader of FIG. 2.

The following is a detailed description of the preferred embodiments of the invention, reference being made to the drawings in which the same reference numerals identify the same elements of structure in each of the several figures.

As indicated above, storage phosphor can be disposed on a medium which can be flexible, semi-flexible, semi-rigid, or rigid (i.e., a screen), and can be configured as a sheet or other substantially planar arrangement. For ease of discussion, the present invention will be described with regard to the medium being a flexible sheet. The medium is often referred to as a screen.

Referring to FIG. 1, there is shown an exemplary storage phosphor reader 10 in accordance with the present invention. Storage phosphor reader 10 processes images captured on storage phosphor using conventional radiographic equipments. Reader 10 then scans the storage phosphor and converts the latent x-ray image therein into an electrical x-ray image signal that can be viewed. Reader 10 can be operated using a computer interface keyboard, buttons, mouse, touch screen, or the like, generally illustrated in FIG. 1 at 12.

The screen can be mounted in an x-ray cassette. An example of such a cassette is disclosed in U.S. Pat. No. 5,943,390, issued Aug. 24, 1999, inventors Wendlandt et al. and U.S. Ser. No. 10/767,277 provisionally filed on Feb. 3, 2003 as Provisional Application U.S. Ser. No. 60/444,462, both being commonly assigned and incorporated herein by reference. Such cassettes can be of varying sizes.

Once the radiology technologist exposes a body part to an x-ray which is stored as a latent image on the screen, the cassette is loaded into reader 10 at a supply area or receiving station 14. Receiving station 14 is shown in FIG. 1 as a load platform. Scanning is then initiated, for example, by pressing a start button or automatically by insertion of the cassette into receiving station 14.

Referring now to FIGS. 2–5, inside reader 10, using means known to those skilled in the art, the screen is extracted from the cassette and moved along a path P in a direction A through a scan reader assembly disposed in a scan area 16 wherein the screen is scanned.

The storage phosphor used to hold the latent image can be erased and used repeatably. Therefore, once a portion of the screen has been scanned, it is erased by being moved through an erase assembly disposed in an erase area 18 wherein it is erased by exposure to light which removes the remnants of the image. Once the entire screen has been scanned and erased, the direction of the screen is reversed and the screen is returned to the cassette. Alternatively, the screen can be erased as the screen is being returned to the cassette (i.e., when traveling in the direction reverse to direction A).

The screen is extracted from the cassette and moved along a path P in a direction A. Transport means known to those skilled in the art can be employed to transport the screen along path P. For Applicant's particular application, a first pair of rollers 19a,19b has been found suitable. A second pair of rollers 29a, 29b can be employed. In a preferred arrangement, roller 19a is fixed and is driven to form a nip which provides for the transport of the screen along path P.

Rollers 19a,19b move the screen along path P to scan area 16. Typically, as indicated above, in a CR reader the laser beam is scanned in a scanline over the surface of a storage phosphor screen, for example, by a reciprocating galvanometer mirror or polygon rotating mirror, in a fast scan direction while the screen is transported under the scanline in a slow scan direction.

Figure 4:
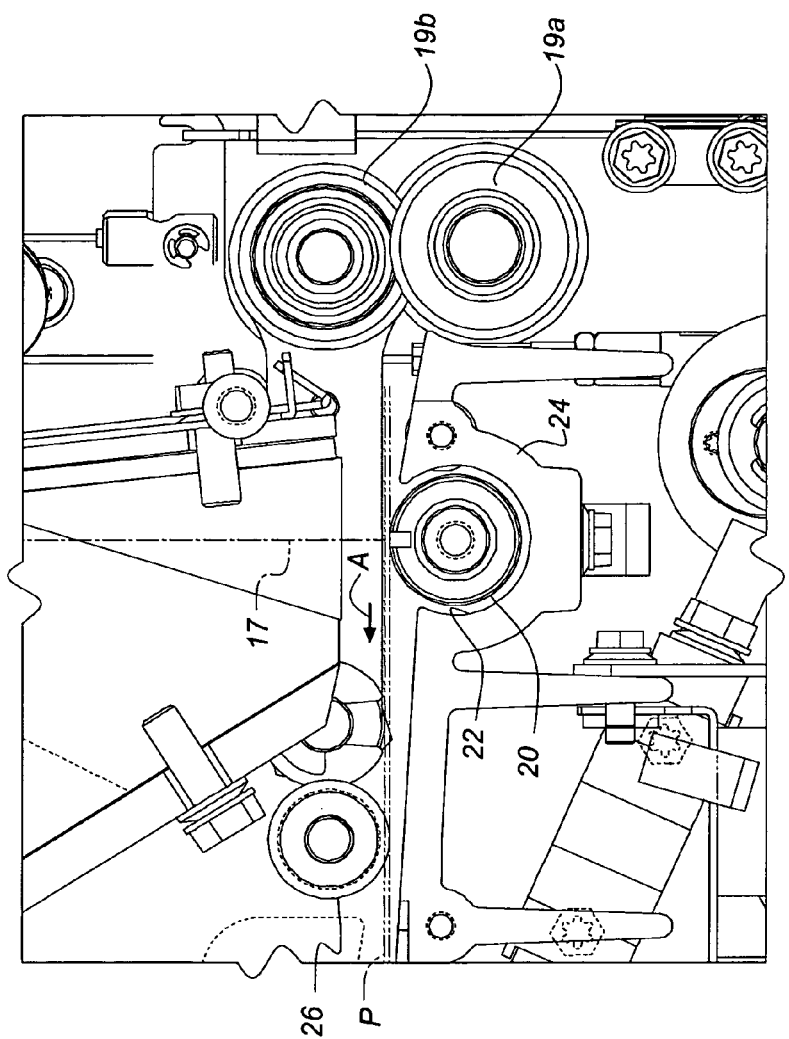
FIG. 4 shows a diagrammatic view of a portion of the scan reader assembly of the storage phosphor reader of FIG. 3.
Figure 5:
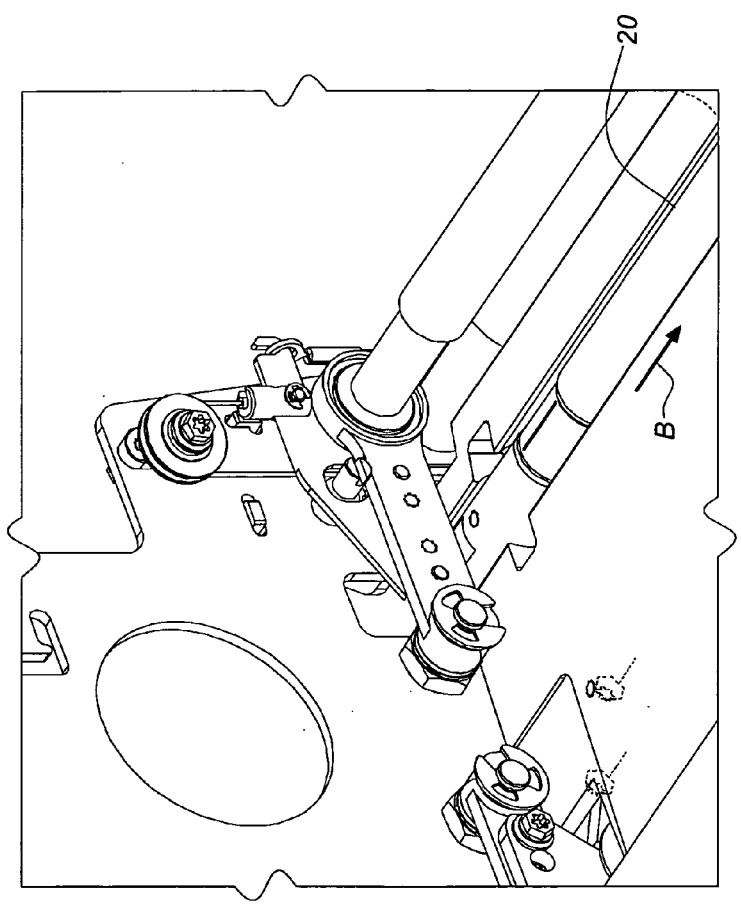
FIG. 5 shows a perspective view of the storage phosphor reader of FIG. 4.
Figure 6:
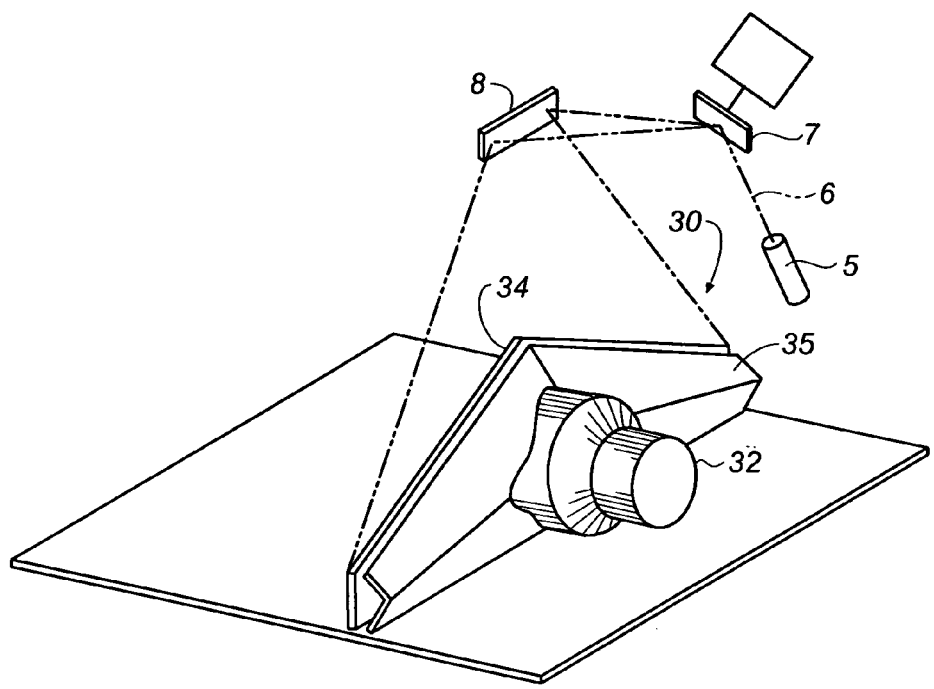
FIG. 6 shows a perspective view of a laser scanning optical system.
Figure 7:
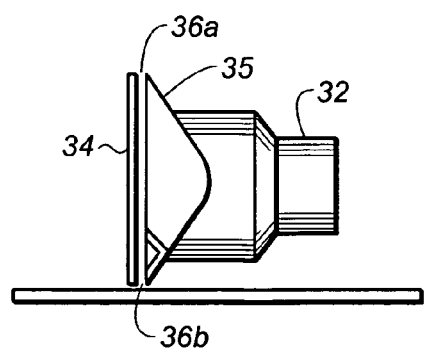
FIG. 7 shows a side elevation of the laser scanning optical system of FIG. 6.

Scan area 16 includes a laser scanning optical system for use in a computed radiography scanning system (or any other similar scanning system). Such a laser scanning optical system is well known to those skilled in the art, for example, as disclosed in U.S. Ser. No. 10/742,222 provisionally filed on Dec. 19, 2003 as U.S. Provisional No. 60/444,014, commonly assigned and incorporated herein by reference. The laser scanning optical system can includes a laser diode 5 which produces a laser beam 6 shaped by shaper lens elements. A reciprocating galvonometer mirror 7 can be employed to produce a laser beam scanline 17 in a fast scan direction (noted by arrow B in FIG. 5). The scan line is directed onto a scan platen 20. Scan platen 20 establishes an imaging region for a storage phosphor screen transported in a slow scan direction over platen 20. As best shown in FIG. 4, scan platen 20 has a cylindrical surface and is recessed in a channel 22 of guide plate 24. The surface of scan platen 20 locates the screen at the focal point F of the scanning laser beam during the reading process.

Referring now to FIGS. 1–7, the emitted radiation from the storage phosphor is collected and detected by a light collector assembly 30 and photodetector 32 (such as a photomultiplier tube). Light collectors are well known. Examples of light collectors are disclosed in U.S. Pat. No. 4,743,758 (Chan), U.S. Pat. No. 5,134,290 (Boutet), U.S. Pat. No. 5,140,160 (Boutet), and U.S. Pat. No. 5,105,079 (Boutet), all commonly assigned and incorporated herein by reference. Light collector assembly 30 includes mirrors 34, 35. Mirrors 34, 35 form slots 36a, 36b. The stimulating laser beam 6 passes through slots 36a, 36b to stimulate the storage phosphor screen. Light emitted by the screen passes into collector assembly 30 through lower slot 36b.

Figure 8:
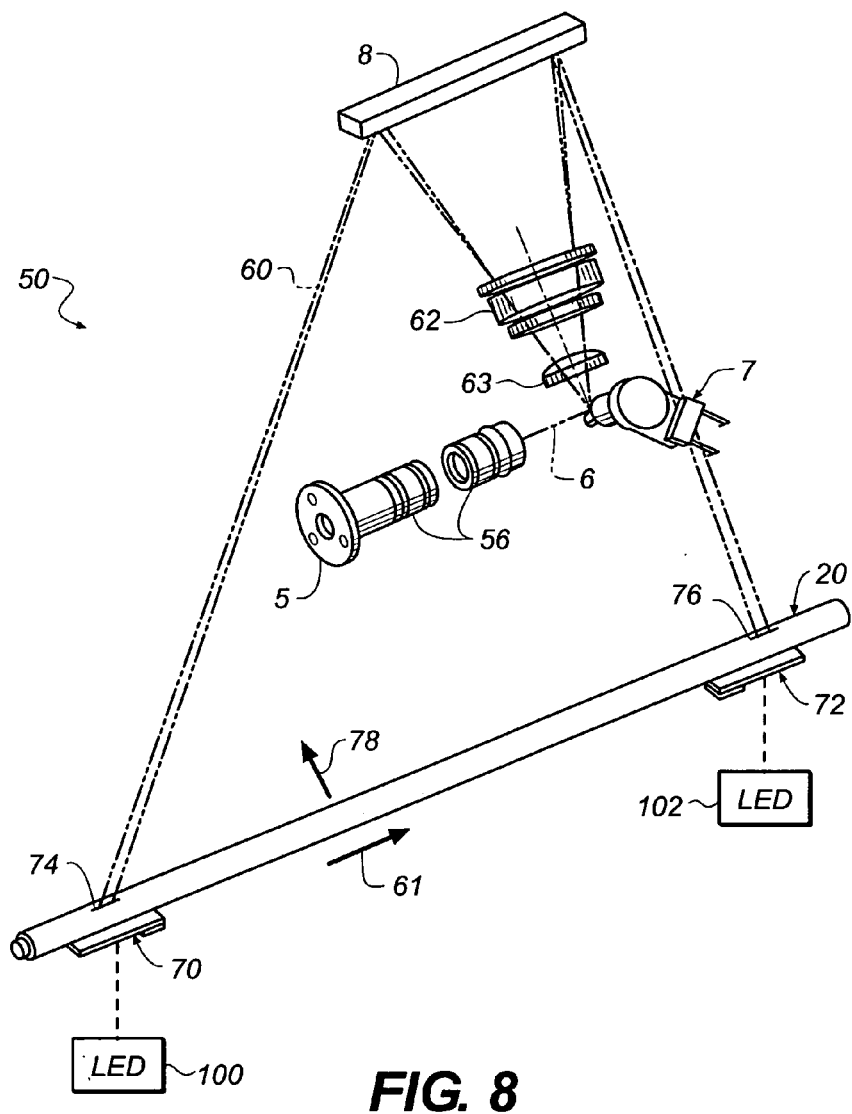
FIG. 8 shows a diagrammatic view of the principle components of a laser scanning optical system in accordance with the present invention.

Referring now to FIG. 8, there is shown a laser scanning optical system for use in a computed radiography scanning system (or any other similar scanning system) incorporating an embodiment of the present invention. As shown, laser scanning optical system 50 includes a laser diode 5 which produces a laser beam 6 shaped by shaper lens elements 56. Reciprocating galvonometer mirror 7 produces a laser beam scan line 60 in a fast scan direction 61 shaped by lens 62 and lens 63. Mirror 8 directs scan line 60 onto scan platen 20. Scan platen 20 establishes an imaging region for a storage phosphor transported in a slow scan direction 78 over platen 26.

Sensors, photodetectors, or photodiodes 70 and 72 are located at the ends of scan line 60 and are activated by laser beam 6 passing through respective slots 74 and 76 in platen 20. A rotating multifaceted polygon mirror can also be used in place of the reciprocating galvonometer mirror 7 to produce laser beam scan line 60. Sensor or photodiode 70 is coupled to a visual indicator such as a light-emitting diode (LED) 100 and sensor/photodiode 72 is coupled to a light-emitting diode (LED) 102. Accordingly, an LED 100, 102 is positioned behind scan platen 20 at each end of the scanline, and a photodiode is connected to each LED. Preferably, LEDs 100, 102 are of a different color. Alternatively, one multicolored LED can be used in place of two single color LEDs.

The use of different color LEDs can allow the operator to detect any skew or twist in the open of light collector assembly 30.

Figure 9:
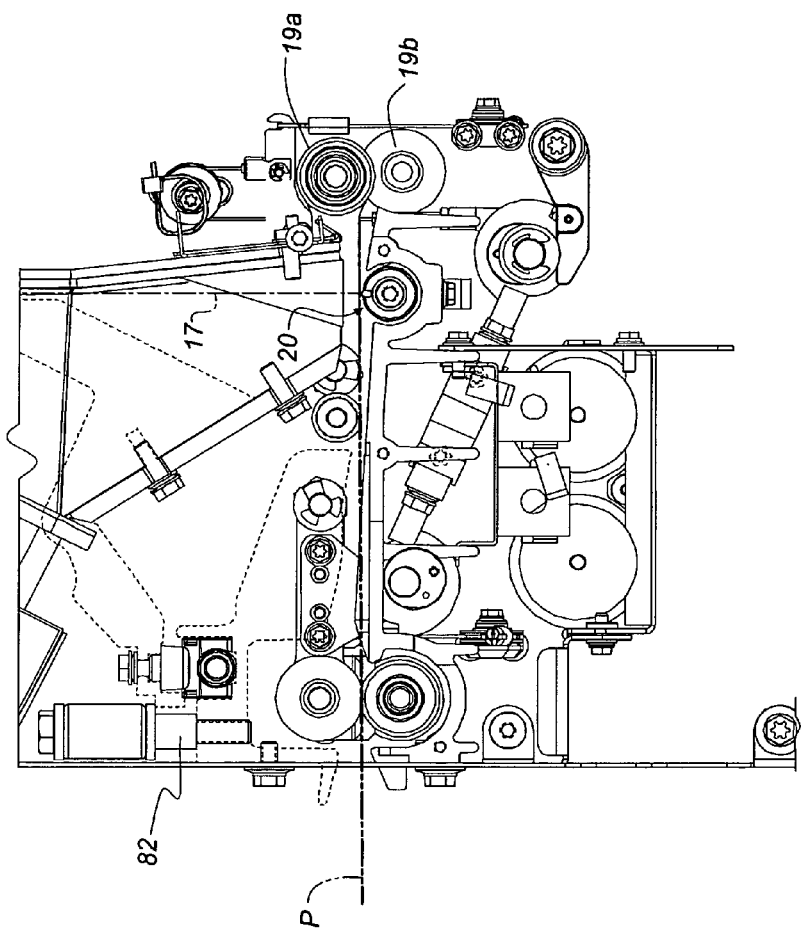
FIG. 9 shows a diagrammatic view of a portion of the storage phosphor reader of FIG. 3.
Figure 10:
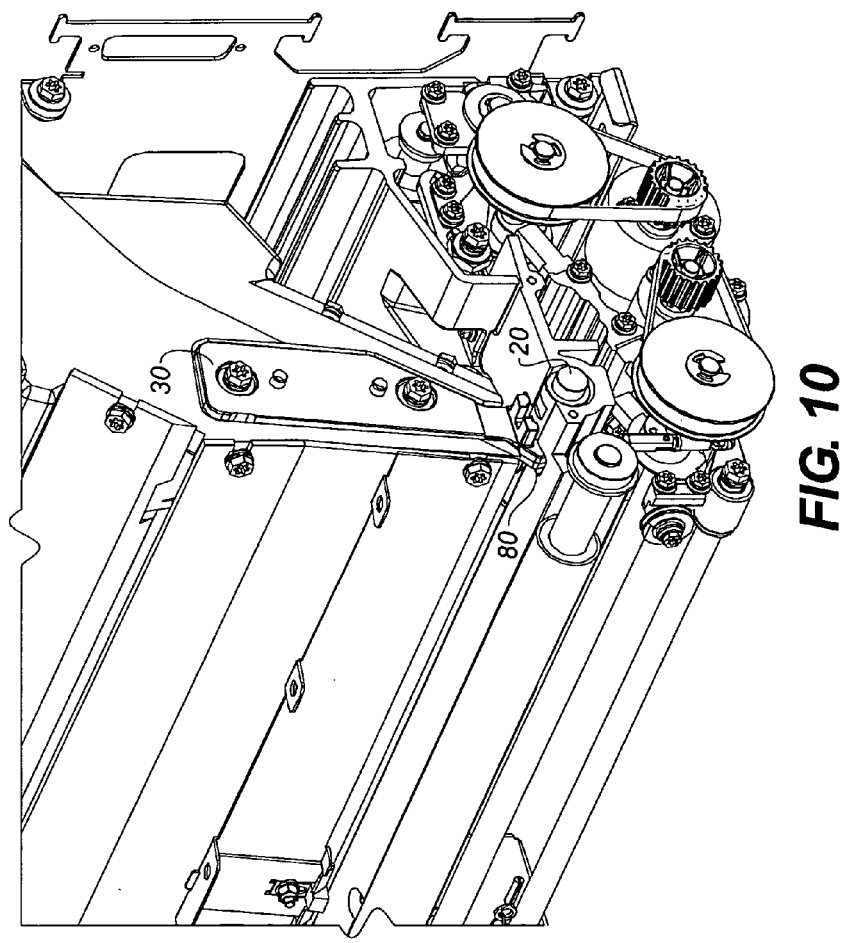
FIG. 10 shows a perspective view of a portion of the storage phosphor reader of FIG. 3.

Light collector assembly 30 is mounted within reader 10 so as to rotate/pivot about a center point of scan platen 20. As best shown in FIGS. 9 and 10, light collector assembly 30 pivots about a pivot point 80, and a collector assembly adjustment member 82 is employed to adjust light collector assembly 30 at a desired position. Since light collector assembly 30 must be precisely positioned, adjustment member 82 provides a very fine adjustment. That is, several turns of adjustment member 82 provides an very small amount of movement of light collector assembly 30. Light collector assembly 30 can be located relative to scan platen 20 using a "v" groove interface one both ends to the scanline.

The present invention is directed to a method of aligning light collector assembly to the scanline to ensure that laser beam 6 passes through slots 36a, 36b of light collector assembly 30 to emit light onto the screen.

Generally, adjustment member 82, when used with LEDs 100 and 102, allows an operator to define the actual size and shape (skew) of the scanline opening, by moving (rocking/pivoting) light collector assembly 30 about the center of scan platen 20 and observing the LEDs conditions. The limits of the opening of the collector are detected, and the opening is centered.

Figure 11:
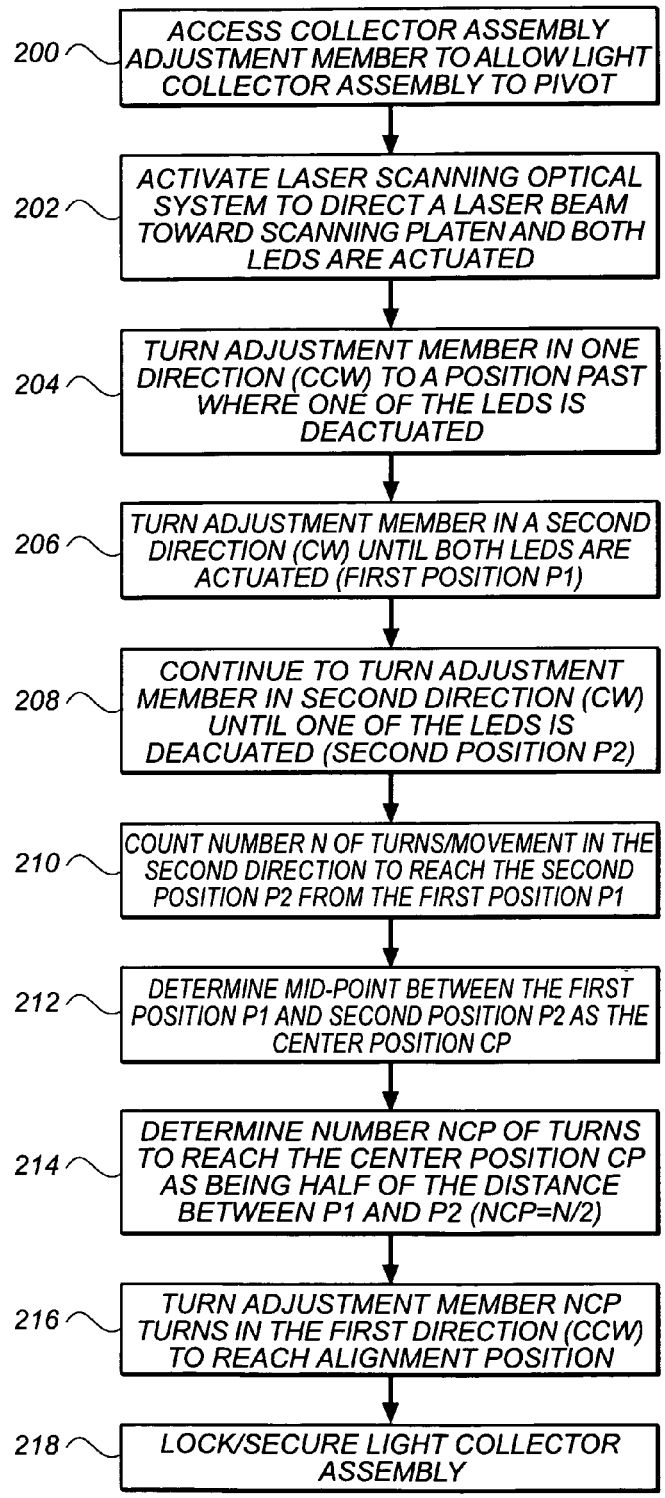
FIG. 11 shows a flow diagram of a method of a first embodiment in accordance with the present invention.

In one embodiment, the opening is centered by calculating the halfway travel distance and making the corresponding adjustment to that position. More particularly, for aligning the light collector assembly to the laser scanline, light collector assembly 30 is moved/pivoted about the center of scan platen 20 while observing the condition of LEDs 100, 102. This method is more particularly described with reference to the flow diagram of FIG. 11.

At step 200, collector assembly adjustment member 82 is accessed so that light collector assembly 30 can pivot about pivot point 80.

At step 202, laser scanning optical system 50 is activated whereby a laser beam is directed toward scanning platen 20 and both LEDs (LED 100 and 102) are actuated (i.e., lit).

Next, at step 204, adjustment member 82 is turned/moved/translated in one direction (for example, if turned, counter clockwise) to a position past wherein one of the LEDs (LED 100 or 102) is no longer actuated (i.e., goes out). This condition indicates that the laser beam is abutting or directed on one side of slot 36a.

(It is noted that continuing to turn adjustment member 82 in the first direction until the second LED goes out will indicate the amount of skew in the scanline opening in the collector. A numerical value for this skew can be calculated by converting the number of turns required, from the first LEDs deactuation to the second LEDs deactuation, into a linear measurement.)

At step 206, adjustment member 82 is turned/moved/translated in a second direction (opposite the first direction, for example, clockwise if the first direction was counter clockwise) until both LED's are re-actuated. This is referred to as a first position P1. Then, a number of turns (N) is counted from this first position P1, in the second direction, to reach a second position P2 wherein one of the LEDs (LED 100 or 102) is no longer actuated (step 208). This condition indicates that the laser beam is abutting or directed on another side of slot 36a. The number (N) of turns/movement in the second direction to reach the second position P2 from the first position P1 is counted/measured (step 210). As indicated above, adjustment member 82 may be sensitive, so it might be required to actuate 50 to 100 turns (i.e., N) of adjustment member 82 to reach the second position from the first position.

The mid-point between the first position P1 and second position P2 is the center position CP (step 212). Therefore, a number (NCP) of turns to reach the center position CP is half of the distance/turns between P1 and P2. (i.e., NCP=N/2) (step 214). Therefore, adjustment member 82 should be turned/moved NCP turns/movement in the first direction to reach the center position, that is, the alignment position (step 216). Once the desired position is obtained, the light collector assembly is locked/secured to that position to prevent loss of the adjustment (step 218).

Compensations for other considerations, such as scanline bow, can be made be calculating the required travel distance. That is, there might be some bow to the scanline due to the alignment of optical components of the scanning subsystem. If such bow exists, it can be accounted for by adding or subtracting half the bow distance from the number (NCP) of turns to the center position, depending on the direction of the bow (i.e., positive or negative). A known amount of scanline bow may be compensated for by converting the known numerical (linear) value into turns of the adjustment member 82 and dividing by 2 ($N_B$). The number of turns ($N_B$) to compensate for scanline bow are then factored into the number of turns to center the scanline opening (NCP) in a direction corresponding to the direction of the bow.

Figure 12:
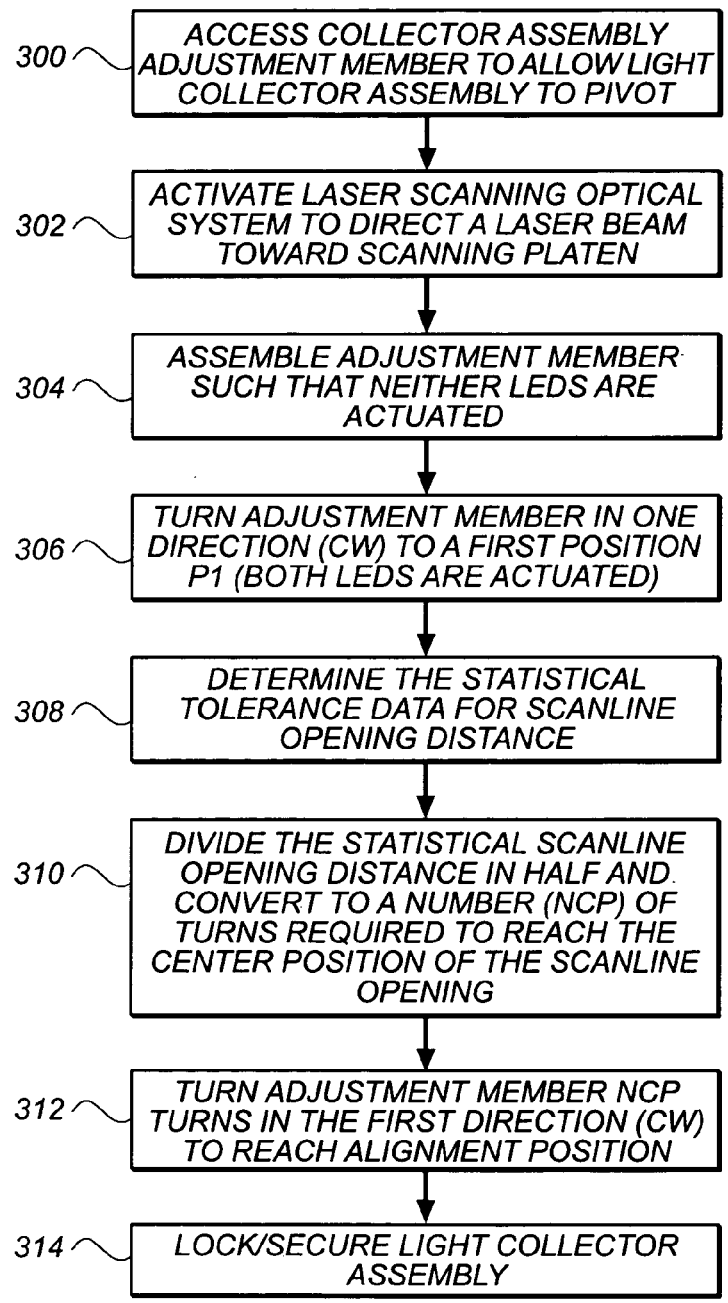
FIG. 12 shows a flow diagram of a method of a second embodiment in accordance with the present invention.

In a second embodiment of a method for aligning the light collector assembly to the laser scanline, statistical tolerancing is employed. This method is more particularly described with reference to the flow diagram of FIG. 12.

At step 300, collector assembly adjustment member 82 is accessed so that light collector assembly 30 can pivot about pivot point 80.

At step 302, laser scanning optical system 50 is activated whereby a laser beam is directed toward scanning platen 20.

At step 304, adjustment member 82 is assembled such that neither of the LEDs (LED 100 and 102) are actuated (i.e., neither are lit). This condition indicates that the scanline is completely blocked by the edge of the light collector scanline opening.

Next, at step 306, adjustment member 82 is turned/moved/translated in one direction (for example, if turned, clockwise) to a first position P1 wherein both of the LEDs (LED 100 or 102) are actuated (i.e., lit).

At step 308, the statistical tolerance data for the scanline opening in the light collector, for a given lot/grouping of assemblies, is known. This linear distance is divided in half and converted into a required number (NCP) of turns of adjustment member 82 to reach the center position of the scanline opening, in the light collector, relative to the scanline (step 310). Adjustment member 82 should be turned/moved NCP turns/movement in the first direction from the first position to reach the statistical center position, that is, the alignment position (step 312). Once the desired position is obtained, the light collector assembly is locked/secured to that position (step 314).

As with the method of the first embodiment, there may be bow in the system. Like the first method, if such bow exists, it can be accounted for by adding or subtracting half the bow distance from the number (NCP) of turns to the center position depending on the direction of the bow (positive or negative). A known amount of scanline bow may be compensated for by converting the known numerical (linear) value into turns of adjustment member 82 and dividing by 2 ($N_B$). The number of turns ($N_B$) to compensate for scanline bow are then factored into the number of turns to center the scanline opening (NCP) in a direction corresponding to the direction of the bow.

A linkage or extension is can be employed to adjustment member 82 to allow adjustment to occur from the exterior of reader 10.

The fidelity of adjustment member 82 can be set to meet the needs of the product. Fine or course or both can be built into the adjustment member.

It is noted that, using the apparatus and method of the present invention, the adjustment of light collector assembly 30 can be accomplished without direct observation of the beam. As such, the present invention reduces laser safety hazards and provides repeatable and known alignment precision since the light collector entrance (36a) is aligned to the laser scanline by direct detection of the size of the opening (36a) of the light collector entrance, and then centering the collector entrance opening with respect to the scanline.

Figure 14:
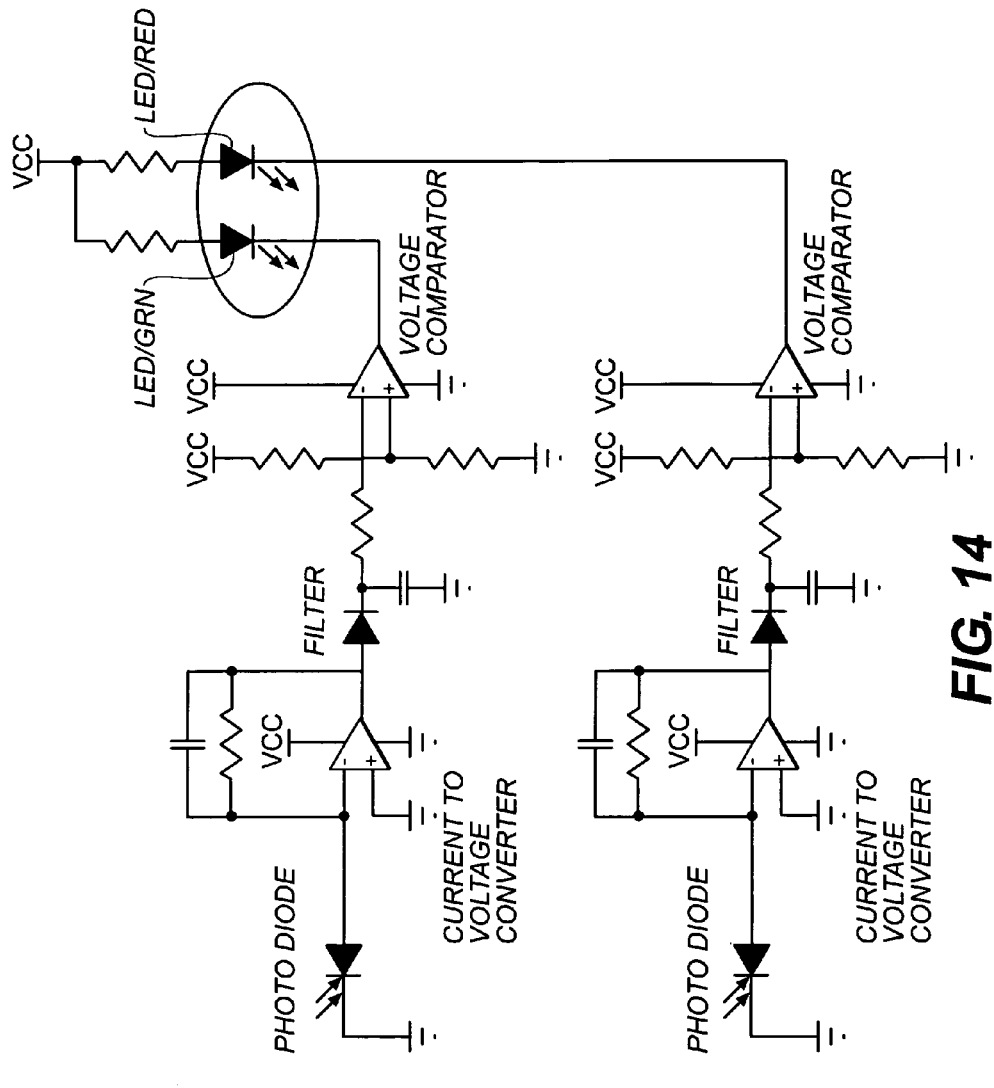
FIG. 14 shows an exemplary circuit diagram suitable for coupling a visual indicator to each of the first and second photodetectors.
Figure 13:
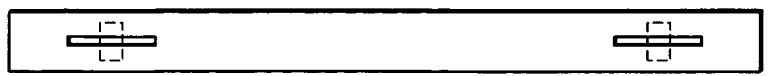
FIG. 13 shows a diagrammatic top view of the scanning platen showing the openings and the photodetectors positioned behind the scanning platen at each of the openings.

FIG. 13 shows a diagrammatic top view of the scanning platen showing the openings disposed at each of the ends and the photodetectors positioned behind the scanning platen at each of the openings. FIG. 14 shows an exemplary circuit diagram suitable for coupling a visual indicator to each of the first and second photodetectors to visually indicate detection of the scanline at the openings of the scanning platen. As discussed above, mechanical adjustments are made until the sweeping laser is projecting within the slots. The energy from the laser on the pin diode causes the diode conduct, in turn turning on the LED associated with that diode.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 5 laser diode
6 laser beam
7 galvonometer mirror
8 mirror
10 storage phosphor reader
12 touch screen display
14 receiving station
15 cassette
16 scan area
17 scanning laser beam
18 erase area
19a–19b rollers
20 scan platen
22 channel
24 guide plate
26 platen
29a,29b rollers
30 light collector assembly
32 photodetector
34,35 mirrors
36a,36b upper and lower slots
50 laser scanning optical system
56 lens element
60 laser beam scan line
61 scan direction
62,63 lens
70,72 photodiodes
74,76 slots
80 collector mount pivot point
82 assembly adjustment member
100,102 LEDs
200 step-collector assembly adjustment member
202 step-laser scanning optical system
204,206 step-turn adjustment member
208 step-adjust member
210 step-count turns
212 step-determine mid-point
214 step-determine number NCP
216 step-determine alignment position
218 step-lock/secure light collector assembly
300 step-access collector assembly adjustment
302 step-activate laser scanning optical system 304 step-assemble adjustment member
306 step-adjustment member
308 step-determine statistical tolerance data
310 step-divide statistical scanline opening distance
312 step-adjustment member NCP
314 step-lock/secure light collector assembly

The invention claimed is:

1. An optical imaging system for aligning a light collector to a laser scanline, comprising:
   an optical assembly for producing a laser beam scanline directed at a scanning platen, the scanning platen including a narrow opening disposed proximate each of its ends in the path of the scanline;
   first and second photodetectors disposed behind the scanning platen, one at each of the openings, in the path of the scanline, such that the scanning platen is disposed intermediate the optical assembly and the first and second photodetectors;
   a visual indicator coupled to each of the first and second photodetectors to visually indicate detection of the scanline at the openings of the scanning platen; and
   a light collector assembly for collecting light emitted, reflected or transmitted by a scanned information media, the light collector assembly being pivotable about a centerpoint of the scanning platen and including an adjustment member for pivotably moving the light collector assembly about the centerpoint to align the light collector assembly to the scanline.

2. A method for aligning an optical imaging system, comprising the steps of:
   directing a laser beam scanline at a scanning platen, the scanning platen including an opening disposed at each of its ends;
   mounting a light collector assembly for pivotable movement about a centerpoint of the scanning platen, the light collector assembly being adapted for collecting light emitted, reflected or transmitted by a scanned information media;
   providing an adjustment member for pivotably moving the light collector assembly about the centerpoint to align the light collector assembly with the scanline;
   positioning first and second photodetectors behind the scanning platen, one at each of the openings; and
   coupling a visual indicator to each of the first and second photodetectors to visually indicate detection of the scanline at the openings of the scanning platen while pivotably adjusting the light collector assembly using the adjustment member.

3. A method for aligning an optical imaging system, comprising the steps of:
   providing an optical imaging system, comprising:
      (a) an optical assembly for producing a laser beam scanline directed at a scanning platen, the scanning platen including an opening disposed at each of its ends;
      (b) first and second photodetectors disposed behind the scanning platen, one at each of the openings;
      (c) a visual indicator coupled to each of the first and second photodetectors to visually indicate detection of the scanline at the openings of the scanning platen; and
      (d) a light collector assembly for collecting light emitted, reflected or transmitted by a scanned information media, the light collector assembly being pivotable about a centerpoint of the scanning platen and including an adjustment member for pivotably moving the light collector assembly about the centerpoint;
   activating the optical imaging system to direct the laser beam toward the scanning platen; and
   adjusting the position of the light collector assembly using the adjustment member while monitoring the visual indicators to align the light collector assembly to the scanline.

4. A method for aligning an optical imaging system, comprising the steps of:
   providing an optical imaging system, comprising:
      (a) an optical assembly for producing a laser beam scanline directed at a scanning platen, the scanning platen including an opening disposed at each of its ends;
      (b) first and second photodetectors disposed behind the scanning platen, one at each of the openings;
      (c) a visual indicator coupled to each of the first and second photodetectors to visually indicate detection of the scanline at the openings of the scanning platen; and
      (d) a light collector assembly for collecting light emitted, reflected or transmitted by a scanned information media, the light collector assembly being pivotable about a centerpoint of the scanning platen and including an adjustment member for pivotably moving the light collector assembly about the centerpoint;
   activating the optical imaging system to direct the laser beam toward the scanning platen; and
   adjusting the position of the light collector assembly using the adjustment member while monitoring the visual indicators to align the light collector assembly to the scanline by:
      (a) moving the adjustment member to direct the laser beam toward the scanning platen such that both visual indicators are actuated;
      (b) moving the adjustment member in a first direction such that one of the visual indicators is deactuated;
      (c) moving the adjustment member in a second direction opposite the first direction until both visual indicators are actuated to define a first position;
      (d) continuing to move the adjustment member in the second direction until one of the visual indicators is deactuated to define a second position; and
      (e) aligning the optical imaging system by moving the adjustment member to a position intermediate the first and second positions.

5. The method of claim 4, wherein the intermediate position is half-way between the first and second positions.

6. A method for aligning an optical imaging system, comprising the steps of:
   providing an optical imaging system, comprising:
      (a) an optical assembly for producing a laser beam scanline directed at a scanning platen, the scanning platen including an opening disposed at each of its ends;
      (b) first and second photodetectors disposed behind the scanning platen, one at each of the openings;
      (c) a visual indicator coupled to each of the first and second photodetectors to visually indicate detection of the scanline at the openings of the scanning platen; and (d) a light collector assembly for collecting light emitted, reflected or transmitted by a scanned information media, the light collector assembly being pivotable about a centerpoint of the scanning platen and including an adjustment member for pivotably moving the light collector assembly about the centerpoint;

activating the optical imaging system to direct the laser beam toward the scanning platen; and adjusting the position of the light collector assembly using the adjustment member while monitoring the visual indicators to align the light collector assembly to the scanline by:

(a) moving the adjustment member to direct the laser beam toward the scanning platen such that the first and second visual indicators are deactuated;
(b) moving the adjustment member in a first direction such that the first and second visual indicators are actuated to define a first position;
(c) determining a statistical tolerance of a scanline opening for the light collector assembly; and
(d) aligning the optical imaging system by moving the adjustment member in the first direction by a distance equal to half the statistical tolerance.

* * * * *